No. 780,564. Patented January 24, 1905.

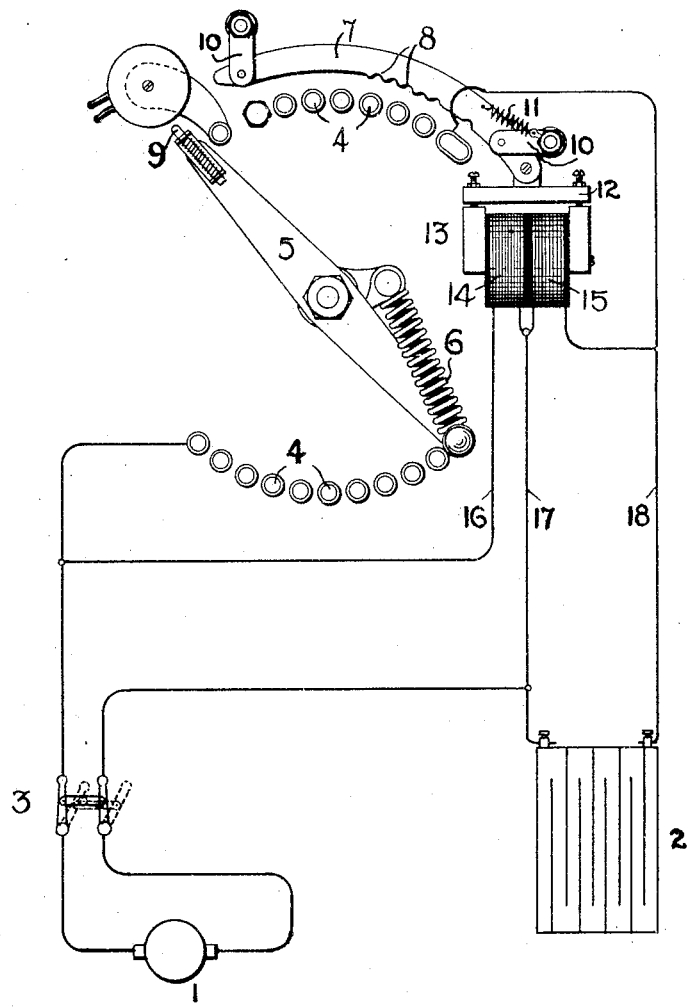

UNITED STATES PATENT OFFICE.

JOHN L. HALL, OF SCHENECTADY, NEW YORK, ASSIGNOR TO GENERAL ELECTRIC COMPANY, A CORPORATION OF NEW YORK.

CHARGING STORAGE BATTERIES.

SPECIFICATION forming part of Letters Patent No. 780,564, dated January 24, 1905.

Application filed July 13, 1903. Serial No. 165,219.

*To all whom it may concern:*

Be it known that I, JOHN L. HALL, a citizen of the United States, residing at Schenectady, in the county of Schenectady, State of New York, have invented certain new and useful Improvements in Charging Storage Batteries, of which the following is a specification.

This invention relates to apparatus for automatically cutting out a storage battery from the charging-circuit when the drop across the battery-terminals reaches a predetermined value. In devices of this kind it is desirable to be able to set the tripping mechanism so that the battery can be cut out at any desired voltage and when cut out will be protected by a resistance-coil against the ill effects of an accidental reclosing of the main switch.

My invention aims to provide a charging device capable of accomplishing these results; and it consists in a rheostat similar to that shown in my Patent No. 716,222, but with the control-magnet wound with two coils arranged to oppose each other, one being connected across the machine-terminals and the other across the battery-terminals or across the rheostat resistances. On starting, the control-magnet flux is due solely to the magnetizing effect of the coil connected across the machine-terminals; but as the voltage of the battery increases the winding connected across its terminals exerts an increasing magnetizing effect in opposition to that of the other winding, and when a point is reached beyond which it is not safe to proceed the resultant flux will be zero, the armature will be released, and the switch automatically opened. The relation between the two coils can be proportioned so as to open the circuit at any predetermined point. This is preferable to a coil responsive to the machine-current only, particularly when charging from a current of varying voltage, as it is not safe to run the charging-point of the battery up to anywhere near the normal voltage of the charging-circuit, for the reason that if the line voltage should by accident drop below the voltage of the battery the latter immediately proceeds to discharge through the generator and run it as a motor. This can be avoided in my present invention by properly proportioning the windings on the differential coil so that the circuit will be opened a safe distance from the normal line voltage. By using a rheostat in which the movable switch-arm can be locked at any point the strength of the charging-current can be regulated to suit the capacity of any battery.

The accompanying drawing is a diagram of circuits including my improved charging device.

The generator 1 is connected with the storage battery 2 through a main switch 3, preferably of the double-pole type. In the circuit is included a rheostat the contact-steps of which are shown at 4 and the rotary switch-arm at 5. The arm is urged to the "off" position by a spring 6, one end of which is attached to the end of the switch-arm and the other to a fixed post offset slightly from the pivot of the switch-arm and is locked on any of the steps in the latter part of its movement by an arc-shaped catch-bar 7, having notches 8, with which engages a spring-pin 9 on the arm. The catch-bar is supported on the links 10, and a spring 11, having one end attached to the catch-bar and the other to a fixed post, tends to swing it downward, bringing an armature 12, secured to the catch-bar, into coöperative relation with a control-magnet 13. On said magnet are two windings 14 15, either tandem or superposed, one connected by leads 16 17 across the terminals of the generator and the other connected by leads 17 18 across the terminals of the battery. These windings are of course of high resistance and are so connected as to oppose each other.

The operation is as follows: When the main switch is closed, the winding 14 is energized and attracts the armature 12, pulling down the catch-bar into operative position. The arm 5 is then turned, first closing the charging-circuit through the resistance-coils of the rheostat and then gradually cutting out said coils until the proper point is reached for the best charging effect with the battery in circuit. The spring-pin 9 entering the corresponding notch in the catch-bar retains the arm in this position. As the voltage of the battery rises the opposing effect of the winding 15 neutralizes that of the winding 14 until a predetermined ratio is established, at which point the magnet ceases to attract the armature. The spring 6 thereupon forces up the catch-bar by the lateral pressure of the pin 9 against the inclined side of the notch 8, and the arm 5 being thus released is returned by the spring 6 to the off position. It will be seen that this operation will take place irrespective of any other battery that may be connected with the generator and that if the main switch should be opened while the battery is charging the rheostat will also open automatically, protecting the battery from any evil effects of suddenly closing the main circuit with little or no resistance therein. Moreover, when a battery becomes charged and cuts itself out, the rheostat-arm immediately flies back to the off point, so that if a person should connect up a second battery to be charged on closing the main switch no trouble would ensue.

In accordance with the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. The combination with a generator and a storage battery, of an automatically-opening charging-rheostat provided with a control-magnet having two windings, one winding being connected across the generator-terminals and the other winding being connected across the battery-terminals and arranged to act always in opposition to the first-mentioned winding.

2. The combination with a generator and a storage battery, of a resistance in series therewith, a spring-actuated switch-arm for cutting said resistance in and out, a coil in circuit with the generator for holding said switch closed, and a reverse-current coil connected with the battery for releasing said arm.

3. The combination with a generator and a storage battery, of a resistance in series therewith, a spring-actuated switch-arm for cutting said resistance in and out, means for locking said arm at any point in its movement, and a reverse-current coil for releasing said arm when the voltage of the battery rises to a predetermined value.

4. A rheostat provided with a spring-actuated switch-arm, a pivoted catch-bar provided with notches to arrest said arm at intermediate points of resistance adjustment, an armature carried by said bar, and a magnet cooperating with the armature and having two opposed windings.

In witness whereof I have hereunto set my hand this 10th day of July, 1903.

JOHN L. HALL.

Witnesses:
 BENJAMIN B. HULL,
 HELEN ORFORD.